United States Patent
Nabata

(10) Patent No.: US 6,635,338 B1
(45) Date of Patent: Oct. 21, 2003

(54) MAGNETIC RECORDING TAPE AND METHOD FOR MANUFACTURING THE SAME

(75) Inventor: Yoshiyuki Nabata, Tochigi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 44 days.

(21) Appl. No.: 09/665,128

(22) Filed: Sep. 20, 2000

(51) Int. Cl.⁷ .................................................. G11B 5/73
(52) U.S. Cl. ...................... 428/216; 428/336; 428/480; 428/694 SL
(58) Field of Search ................................ 428/336, 480, 428/216, 694 SL

(56) References Cited

U.S. PATENT DOCUMENTS 6,197,430 B1 * 3/2001 Asakura et al. ............. 428/480

FOREIGN PATENT DOCUMENTS

JP 08-329459 12/1996

* cited by examiner

Primary Examiner—Stevan A. Resan
(74) Attorney, Agent, or Firm—Sughrue Mion, PLLC

(57) ABSTRACT

A magnetic recording tape having improved durability and capable of conducting recording and reproduction of data with high reliability, and a method for manufacturing the same are provided. The magnetic recording tape comprises a substrate having a thickness equal to or less than 7 $\mu$m and at least one magnetic layer provided on one surface of the substrate, and the magnetic recording tape has a longitudinal creep deformation ratio in a range of less than 0.04% when the magnetic recording tape is subjected to a longitudinal tensile stress of 19.1 MPa for 25 minutes at 50° C.

13 Claims, No Drawings

MAGNETIC RECORDING TAPE AND METHOD FOR MANUFACTURING THE SAME

FIELD OF THE INVENTION

The present invention relates to a magnetic recording tape that is excellent in durability, particularly in a cyclic environment, and a method for manufacturing the same, and more particularly it relates to a magnetic recording tape that has suppressed ununiform elongation of the tape and thus can record and reproduce data with high reliability even after repeated use under a cyclic environment, and a method for manufacturing the same.

BACKGROUND OF THE INVENTION

As means for increasing a capacity of a magnetic recording medium, such as a tape, there has been a method of decreasing a thickness of a substrate. When the thickness of a substrate is decreased, however, there are cases where such a phenomenon occurs in that the medium is ununiformly elongated in the longitudinal direction due to a driving tension on recording and reproducing to cause turbulent winding or decrease in running stability, whereby accurate recording and reproduction of data cannot be achieved. The phenomenon becomes conspicuous upon storage and use under high temperatures, under which thermal contraction is liable to occur. The phenomenon brings about a serious problem in a field of a recording medium for backing up data, in which the reliability of data recording and reproduction is extremely important. There is thus demanded to develop a highly reliable magnetic recording medium having high durability that does not cause ununiform elongation of the medium even under severe environments.

SUMMARY OF THE INVENTION

Therefore, an object of the invention is to provide a magnetic recording tape having improved durability capable of recording and reproducing data with high reliability.

Another object of the invention is to provide a method for manufacturing the magnetic recording tape.

As a result of various investigations for shape stability of magnetic recording media conducted by the inventors, a magnetic recording medium that attains the object can be obtained by such a manner that a creep deformation ratio of the medium measured under a specific condition is set less than a specific value.

The invention has been made based on the above finding and relates to a magnetic recording tape which comprises a flexible substrate having a thickness equal to or less than 7 $\mu$m and at least one magnetic layer provided on one surface of the substrate, the magnetic recording tape having a longitudinal creep deformation ratio in a range of less than 0.04% when the magnetic recording tape is subjected to a longitudinal tensile stress of 19.1 MPa for 25 minutes at 50° C.

The invention also relates to a method for manufacturing a magnetic recording tape comprising a flexible substrate having a thickness equal to or less than 7 $\mu$m and at least one magnetic layer provided on one surface of the substrate, the method comprising subjecting said magnetic recording tape to a heating treatment at such a temperature (T) below the equilibrium glass transition temperature (ETg) of the substrate that (ETg-T) is from 1 to 40° C. for 0.5 to 240 hours, thereby obtaining the magnetic recording tape having a longitudinal creep deformation ratio in a range of less than 0.04% when the magnetic recording tape is subjected to a longitudinal tensile stress of 19.1 MPa for 25 minutes at 50° C.

DETAILED DESCRIPTION OF THE INVENTION

The magnetic recording tape of the invention will be described in detail with reference to preferred embodiments thereof below.

In one embodiment of the magnetic recording tape of the invention, a magnetic or non-magnetic lower layer is provided on one surface of a substrate, and a magnetic layer as an uppermost layer (hereinafter simply referred to as an upper layer) is provided on the lower layer. A back layer is provided on another surface of the substrate.

In the magnetic recording tape of the invention, a substrate having a thickness equal to or less than 7 $\mu$m, preferably a thickness of from 2 to 7 $\mu$m, and more preferably from 2 to 4.5 $\mu$m, is used. In other words, the magnetic recording tape of the invention is one of an extremely thin type. When a thin magnetic recording tape is subjected to recording and reproduction on a drive, the tape causes ununiform elongation due to a driving tension to deteriorate the running stability. However, the magnetic recording tape of the invention, owing to the creep deformation ratio of less than the specific value measured under the specified condition, causes no ununiform elongation even when the medium is stored or used under severe environments, so as to improve the durability, particularly cyclic durability, of the medium. As a result, recording and reproduction of data can be achieved with high reliability.

When the creep deformation ratio is less than 0.04%, and preferably less than 0.038%, ununiform elongation of the medium is effectively prevented. It is more preferred as the creep deformation ratio is smaller and is ideally zero, but the lower limit thereof that can be attained by the current level of technology is about 0.012%.

While the standard relating to the creep deformation ratio of a magnetic recording tape is defined in Japanese Industrial Standard(JIS) as remaining elongation (JIS X6141), the remaining elongation defined in JIS is the one measured under considerably mild conditions but not under the severe conditions as in the invention. Therefore, even a tape satisfying the JIS standard cannot always attain the object of the invention. The invention is characterized by the fact that when the creep deformation ratio measured under the specified conditions becomes less than the specified value, no ununiform elongation occurs when the tape is stored or used under severe conditions, independent as to whether or not the tape satisfies the JIS standard. When the creep deformation ratio of the invention is measured according to the JIS standard, no result of significant difference can be obtained. Therefore, the creep deformation ratio of the invention is measured by the method described in detail in Examples described later.

While a method for obtaining the creep deformation ratio in the specified range is not particularly limited, it has been found effective to subject the tape to a heating treatment at a prescribed temperature for a prescribed period of time.

The temperature of the heating treatment is preferably lower than the equilibrium glass transition temperature (hereinafter referred to as ETg) of a material constituting the substrate of the magnetic recording tape by from 1 to 40° C., more preferably from 1 to 35° C., further preferably from 1 to 25° C., and particularly preferably from 1 to 20° C. When the heating treatment temperature is lower than the ETg of the material constituting the substrate by more than 40° C., the heating treatment time becomes too long. When the heating treatment temperature is higher than the ETg, there are cases where the creep deformation ratio cannot be less than the specified value. The ETg is herein defined as follows. A peak temperature of loss modulus of the substrate measured in a frequency range of from 0.0016 to 16 Hz is plotted against reciprocals of the frequency and the temperature to form an Arrhenius plot that is obtained in such a manner that the support is subjected to a suitable heating treatment to make the Arrhenius plot being the Williams-Landel-Ferry(WLF) type (M. L. Williams, et al., J. Am. Chem. Soc., vol. 77, p. 3710 (1955)), and the Arrhenius plot is extrapolated to the lower frequency side to obtain a limiting temperature, which is designated as an ETg.

The specific temperature of the heating treatment varies depending on the material constituting the substrate, and for example, in the case of polyethylene terephthalate (hereinafter referred to as PET) having an ETg of 95° C., the heating treatment temperature is preferably from 55 to 94° C., more preferably from 70 to 94° C., and most preferably from 75 to 94° C.

The period of time for the heating treatment is, while depending on the heating temperature, preferably from a several minutes to 240 hours, more preferably from 10 minutes to 240 hours, and particularly preferably from 30 minutes to 240 hours. When the period of time for the heating treatment is too short, there are cases where the effect of the heating treatment cannot be stably exhibited. Even when the period exceeds 240 hours, the effect cannot further advance by prolonging the period, and thus it is not preferred from the standpoint of production efficiency. After the heating treatment, the tape is preferably subjected to annealing to room temperature.

In the case where PET is used as the substrate, the creep deformation ratio can be easily less than the specified value by subjecting the substrate to the heating treatment in such a manner that a peak temperature of loss modulus of the substrate measured at 0.0016 Hz, which is related to micro-Brownian motion of polymer main chains located in non-crystalline regions, is lower than the value of an equilibrium state of the substrate by not more than 8° C., and preferably not more than 7° C. The equilibrium state herein means such a state that an Arrhenius plot obtained by plotting a peak temperature (relaxation temperature) of loss modulus against reciprocals of the frequency and the temperature becomes the WLF type in the range of frequency of from 0.0016 to 16 Hz. For PET, such state can be obtained by heat treatment for 7 days at 5° C.

The material constituting the substrate may be a polymeric material having no mechanical relaxation peak (peak on the temperature dependency of loss modulus) in a range of frequency of from 0.0016 to 16 Hz and a range of temperature of from 10 to 60° C. Specific examples thereof include PET and polyphenylene sulfide, but it is not limited to them. The substrate constituted with the material may be subjected to uniaxial or biaxial orientation. The material may be used singly or in combination of two or more kinds thereof. The substrate constituted with the material may be subjected to a corona discharge treatment depending on necessity. Among the materials, PET is particularly preferably employed from the standpoints of film forming property, strength and cost.

The lower layer provided on the substrate contains various kinds of powder dispersed in a binder. Examples of the powder used include non-magnetic powder, an abrasive and carbon black. In the case where the lower layer is a magnetic layer, various kinds of ferromagnetic powder, such as hexagonal barium ferrite, is mixed in addition to the powder. The lower layer can be formed by coating and drying a lower layer coating composition obtained by dispersing these components in a solvent. As for the binder, the non-magnetic powder, a lubricant, the abrasive, the carbon black and other additives, those known in the art can be employed. Specific examples thereof include the binders described in Japanese Patent Laid-Open No. 35246/1997, column 4, lines 25 to 32, and the non-magnetic powder described in Japanese Patent Laid-Open No.35246/1997, column 9, line 44 to column 10, line 24.

The dry thickness of the lower layer is preferably from 0.2 to 3.0 $\mu$m, and more preferably from 0.5 to 2.5 $\mu$m, from the standpoints of prevention of deterioration in calendering characteristics of the upper layer, improvement in adhesion property with the upper layer, improvement in impact resistance and durability of the tape, and prevention of excess cupping of the tape.

The upper layer provided on the lower layer contains ferromagnetic powder dispersed in a binder. The ferromagnetic powder preferably has an acicular or spindle shape, by which the surface smoothness can be easily obtained. Examples of the ferromagnetic powder having such shapes include ferromagnetic metallic powder and ferromagnetic iron oxide powder. As the binder of the upper layer, those contained in the lower layer may be employed. The upper layer may contain those component described for the lower layer, as components in addition to the ferromagnetic powder and the binder. The upper layer can be formed by coating and drying an upper layer coating composition containing the components dispersed in a solvent.

The dry thickness of the upper layer is preferably from 0.02 to 2.5 $\mu$m, more preferably 0.02 to 2.2 $\mu$m, and particularly preferably from 0.05 to 1.8 $\mu$m, from the standpoints of improvement in reproduction output on recording short frequencies, improvement in surface property and orientation property, and accomplishment of a high S/N ratio.

A back layer provided on the back surface of the substrate is constituted with a single layer or plural layers. Examples of the single back layer include known ones used in magnetic recording media. Specifically, one described in Japanese Patent Laid-Open No. 35246/1997, column 5, line 41 to column 9, line 4 may be employed. The thickness of the back layer is preferably from 0.05 to 0.8 $\mu$m, and more preferably from 0.1 to 0.7 $\mu$m.

While the embodiment of the magnetic recording tape of a multi-layer coating type has been described heretofore, at least one of the upper layer, the lower layer and the back layer may be a continuous thin film formed by a vacuum film forming method, such as vapor deposition and sputtering. However, since the invention exhibits a conspicuous effect when the coated layer of the coating type tape is thin, it is preferably applied to a multi-layer coating type tape.

The magnetic recording tape of the invention can be used in all recording and reproduction systems of a rotation head type, such as a helical scanning head, and a fixed head type, and exhibits a conspicuous effect when it is used in a recording and reproduction system of a fixed head type.

The invention will be described in more detail with reference to the examples, in which all "part" mean "parts by weight" unless otherwise indicated.

EXAMPLE 1

The following mixing components (other than the hardening agent) were kneaded in a kneader and then dispersed in an agitator, which were then further finely dispersed in a sand mill. After filtering with a filter of 1 μm, the hardening agent was finally added thereto to prepare an upper layer coating composition, a lower layer coating composition and a back layer coating composition having the compositions described below.

Upper Layer Coating Composition

| Upper Layer Coating Composition | |
|---|---|
| Ferromagnetic powder (Acicular ferromagnetic metallic powder mainly containing iron, long axis diameter: 0.07 μm, acicular ratio: 6, coercive force: 180 kA,m, saturation magnetization: 135 Am²/kg) | 100 parts |
| Vinyl chloride-based copolymer (binder) (MR110, trade name, produced by Nippon Zeon Co., Ltd.) | 10 parts |
| Polyurethane resin (binder) (as solid content) (UR8200, trade name, produced by Toyobo Co., Ltd.) | 10 parts |
| Abrasive (α-alumina, average particle diameter of primary particles: 0.3 μm) | 10 parts |
| Carbon black (average particle diameter of primary particles: 20 nm) | 2 parts |
| Myristic acid (lubricant) | 2 parts |
| Butyl stearate (lubricant) | 4 parts |
| Hardening agent (as solid content) (Coronate L, trade name, produced by Nippon Polyurethane Industry Co., Ltd.) | 3 parts |
| Methyl ethyl ketone (solvent) | 100 parts |
| Toluene (solvent) | 50 parts |
| Cyclohexanone (solvent) | 100 parts |
| Lower Layer Coating Composition | |
| Ferromagnetic powder (hexagonal barium ferrite of fine tabular shape, tabular diameter: 0.27 μm, aspect ratio: 5, coercive force: 200 kA/m, saturation magnetization: 70 Am²/kg) | 30 parts |
| Nonmagnetic powder (α-Fe₂O₃, average long axis length: 0.15 μm, acicular ratio: 11) | 70 parts |
| Vinyl chloride-based copolymer (binder) (MR110, trade name, produced by Nippon Zeon Co., Ltd.) | 10 parts |
| Polyurethane resin (binder) (as solid content) (UR8200, trade name, produced by Toyobo Co., Ltd.) | 5 parts |
| Abrasive (α-alumina, average particle diameter of primary particles: 0.3 μm) | 5 parts |
| Carbon black (average particle diameter of primary particles: 20 nm) | 5 parts |
| Myristic acid (lubricant) | 2 parts |
| Butyl stearate (lubricant) | 2 parts |
| Hardening agent (as solid content) (Coronate L, trade name, produced by Nippon Polyurethane Industry Co., Ltd.) | 3 parts |
| Methyl ethyl ketone (solvent) | 100 parts |
| Toluene (solvent) | 50 parts |
| Cyclohexanone (solvent) | 100 parts |
| Back Layer Coating Composition | |
| Carbon black (average particle diameter of primary particles: 18 nm) | 40 parts |
| Carbon black (average particle diameter of primary particles: 75 nm) | 2 parts |

-continued

| | |
|---|---|
| Polyurethane resin (binder) (as solid content) (Nippollan 2301, trade name, produced by Nippon Polyurethane Industry Co., Ltd.) | 20 parts |
| Nitrocellulose (binder) (as solid content) (Celnova BTH ½, trade name, produced by Asahi Chemical Industry Co., Ltd.) | 20 parts |
| Hardening agent (as solid content) (Polyisocyanate, D-250N, trade name, produced by Takeda Chemical Industries, Ltd.) | 4 parts |
| Copper phthalocyanine | 5 parts |
| Stearic acid (lubricant) | 1 part |
| Methyl ethyl ketone (solvent) | 140 parts |
| Toluene (solvent) | 140 parts |
| Cyclohexanone (solvent) | 140 parts |

A PET film having a thickness of 6 μm (ETg: 95° C., biaxially oriented product) was used as a substrate, and the lower layer coating composition and the upper layer coating composition were coated on the substrate by a simultaneous multi-layer coating with a die coater to a dry thickness of the upper layer of 0.15 μm and a dry thickness of the lower layer of 2.1 μm, so as to form coated films. During the coated film transited from a wet state to a dry state, they were subjected to a magnetic orientation treatment with a solenoid of 400 kA/m. Furthermore, hot air at 80° C. was blown onto the coated films at a rate of 10 m/min to dry the films. After being dried, the films were subjected to a calender treatment to form the upper layer and the lower layer. Subsequently, the back layer coating composition was coated on the opposite surface of the substrate to a dry thickness of 0.7 μm and dried at 90° C. to form the back layer. It was then silt to a width of 12.7 mm (½ inch) to produce a magnetic tape. The magnetic tape was finally subjected to a heating treatment under the condition shown in Table 1 below.

EXAMPLES 2 TO 6 AND COMPARATIVE EXAMPLES 1 TO 4

Magnetic tapes were obtained in the same manner as in Example 1, except that the substrate shown in Table 1 was used, and the heating treatment was conducted under the conditions shown in Table 1. In Table 1, PEN means polyethylene naphthalate.

Evaluation of Performance

In order to evaluate the performance of the magnetic tapes of Examples and Comparative Examples, the tapes were measured for the creep deformation ratio, the difference between the peak temperature of loss modulus and the equilibrium state of the substrate, and the rate of occurrence of ununiform elongation of the tape by the following manners. The results obtained are shown in Table 1.

Creep Deformation Ratio

A sample having a length of 22.5 mm and a width of 6 mm was cut out from the magnetic tape. The measurement was conducted by using Rheometrics Solids Analyzer (RSA-II) produced by Rheometric Scientific, Inc., USA, in Constant Stress Mode. The software for measurement control was Rhios ver. 4.4.4. The estimated viscosity for determining the step gradient upon applying a stepwise stress was $2.54 \times 10^{10}$ Pa·s. The measurement temperature was 50° C. (dry air supplied from a compressor was used as a gas for controlling the temperature). The measurement was conducted after 3 minutes from the time when the sample was set. The stress was applied by two steps, 1.91 MPa per 1 minute for the first step and 19.1 MPa per 25 minutes for the second step. The length of the sample after 66.12 seconds from the start of measurement (the initiation point of loading the stress of 19.1 MPa) was designated as an initial length of the sample, and an elongation ratio (percentage) of the sample after the lapse of 25 minutes of the second step was calculated, which was designated as the creep deformation ratio.

Difference between ETg (the Equilibrium Glass Transition Temperature) and Tg measured by a Peak Temperature of Loss Modulus.

The upper and lower layers and the back layer were removed from the magnetic tape by using a solvent to bring out the substrate only. The substrate was cut into two strips each having a length of 22.5 mm and a width of 6 mm to form two substrate samples. One of the two substrate samples was measured for relaxation behavior by using Rheometrics Solids Analyzer (RSA-II). The measurement mode was Dynamic Frequency Temperature Step, and the measurement was conducted in a temperature range that sufficiently encompassed the objective relaxation range under such conditions that the frequency was 0.0016, 0.0034, 0.0074, 0.016, 0.034, 0.074, 0.16, 0.34, 0.76, 1.6, 3.4, 7.4 and 16 Hz, the temperature step was 7° C., the thermal soak time was 1 minute, the pretension was 200% of the dynamic force, and the dynamic strain was 0.03%. The other substrate sample was subjected to heating treatment at 85° C. for 1 week and then measured for relaxation behavior in the same manner. Curves indicating the temperature dependency of the loss modulus at 0.0016 Hz were drawn for the substrate samples, and the peak temperatures thereof were obtained. The peak temperature of the heat-treated sample was designated as Tg, and the peak temperature of the sample subjected to the 1-week heating treatment was designated as ETg, whereby the temperature difference from the equilibrium state (ETg-Tg) was calculated.

Rate of Occurrence of Ununiform Elongation of Tape

Writing and readout were continuously conducted for the full length of the magnetic tape at 40° C., RH80% for 48 hours by using a DLT4000 drive. Thereafter, the tape was taken out from a cartridge and evaluated by naked eye as to whether or not elongation occurred on the tape edge throughout the full length of the tape. 20 tapes were subjected to the measurement, and the rate of the number of tapes causing elongation was expressed in terms of percentage.

TABLE 1

| Substrate | | | Creep defor- mation ratio (%) | Difference between ETg and Tg measured by Peak Temperature of Loss Modulus (° C.) | Rate of Occur- rence of Ununi- form Elongation of Tape (%) |
|---|---|---|---|---|---|
| Kind | Thick- ness (μm) | Heating treat- ment | | | |
| Example 1 | PET | 6 | 75° C./ 10 days | 0.039 | 8 | 0 |
| Example 2 | PET | 6 | 80° C./ 2 days | 0.031 | 6 | 0 |
| Example 3 | PET | 6 | 90° C./ 1 day | 0.020 | 2 | 0 |
| Example 4 | PET | 4.2 | 75° C./ 10 days | 0.038 | 2 | 0 |
| Example 5 | PET | 4.2 | 80° C./ 2 days | 0.030 | 1 | 0 |
| Example 6 | PET | 4.2 | 90° C./ 1 day | 0.022 | 0 | 0 |
| Comparative Example 1 | PEN | 6 | none | 0.083 | —* | 20 |
| Comparative Example 2 | PEN | 4.5 | none | 0.091 | —* | 30 |
| Comparative Example 3 | PET | 6 | none | 0.045 | 11 | 15 |
| Comparative Example 4 | PET | 4.2 | none | 0.043 | 11 | 10 |

Note:
*not evaluated

It is understood from the results shown in Table 1 that the magnetic tapes of the Examples (invention) having a creep deformation ratio of less than the specified value measured under the specified conditions cause no ununiform elongation in the tapes even when recording and reproduction of signals are conducted under the severe conditions and thus have high durability in comparison to the magnetic tapes of the Comparative Examples.

According to the magnetic recording tape of the invention, the durability is improved, and recording and reproduction of data can be conducted with high reliability.

What is claimed is:

1. A magnetic recording tape which comprises a flexible substrate having a thickness equal to or less than 7 μm and at least one magnetic layer provided on one surface of the substrate, said magnetic recording tape having a longitudinal creep deformation ratio in a range of 0.012 to 0.038% when the magnetic recording tape is subjected to a longitudinal tensile stress of 19.1 MPa for 25 minutes at 50° C.

2. The magnetic recording tape as claimed in claim 1, wherein the thickness of said substrate is from 2 to 7 μm.

3. The magnetic recording tape as claimed in claim 1, wherein said substrate comprises polyethylene terephthalate and, a peak temperature of loss modulus of said substrate measured at 0.0016 Hz, which is related to micro-Brownian motion of polymer main chains located in non-crystalline regions, is lower than the equilibrium glass transition temperature(ETg) by not more than 8° C.

4. The magnetic recording tape as claimed in claim 1, wherein a magnetic or non-magnetic lower layer is provided between said substrate and said magnetic layer.

5. The magnetic recording tape as claimed in claim 4, wherein said lower magnetic or non-magnetic layer has a thickness ranging from 0.5 to 2.5 µm.

6. The magnetic recording tape as claimed in claim 1, wherein one or more back layer is provided on the other surface of the substrate.

7. The magnetic recording tape as claimed in claim 6, wherein said back layer has a thickness ranging from 0.1 to 0.7 µm.

8. The magnetic recording tape as claimed in claim 1, wherein said magnetic layer has a thickness ranging from 0.02 to 2.5 µm.

9. A method for manufacturing a magnetic recording tape comprising a flexible substrate having a thickness equal to or less than 7 µm and a magnetic layer provided on one surface of the substrate, the method comprising subjecting said magnetic recording tape to a heating treatment at such a temperature (T) below the equilibrium glass transition temperature (ETg) of the substrate that (Etg-T) is from 1 to 25° C. for 0.5 to 240 hours, thereby obtaining said magnetic recording tape having a longitudinal creep deformation ratio in a range of 0.012 to 0.038% when the magnetic-recording tape is subjected to a longitudinal tensile stress of 19.1 MPa for 25 minutes at 50° C.

10. The method for manufacturing a magnetic recording tape as claimed in claim 9, wherein the thickness of said substrate is from 2 to 7 µm.

11. The method for manufacturing a magnetic recording tape as claimed in claim 9, wherein said substrate comprises polyethylene terephthalate, and a peak temperature of loss modulus of said substrate measured at 0.0016 Hz, which is related to micro-Brownian motion of polymer main chains located in non-crystalline regions, is lower than the equilibrium glass transition temperature by not more than 8° C.

12. The method for manufacturing a magnetic recording tape as claimed in claim 9, wherein a magnetic or non-magnetic lower layer is provided between said substrate and said magnetic layer.

13. The method of manufacturing a magnetic recording tape as claimed in claim 9, wherein said substrate comprises polyethylene terephthalate.

* * * * *